US007954440B2

(12) United States Patent
Joern et al.

(10) Patent No.: US 7,954,440 B2
(45) Date of Patent: Jun. 7, 2011

(54) DEVICE FOR PRODUCING A FIBER PREFORM WITH VIRTUALLY ANY DESIRED SURFACE GEOMETRY BY THE TFP PROCESS

(75) Inventors: Paul Joern, Hamburg (DE); Ulrich Eberth, Rain (DE)

(73) Assignee: Airbus Operations GmbH, Hamburg (DE)

( * ) Notice: Subject to any disclaimer, the term of this patent is extended or adjusted under 35 U.S.C. 154(b) by 671 days.

(21) Appl. No.: 11/988,974

(22) PCT Filed: Jul. 24, 2006

(86) PCT No.: PCT/EP2006/064571
§ 371 (c)(1),
(2), (4) Date: Mar. 17, 2008

(87) PCT Pub. No.: WO2007/010050
PCT Pub. Date: Jan. 25, 2007

(65) Prior Publication Data
US 2009/0229761 A1 Sep. 17, 2009

(30) Foreign Application Priority Data
Jul. 22, 2005 (DE) .......................... 10 2005 034 400

(51) Int. Cl.
*D05B 3/12* (2006.01)
*D05B 39/00* (2006.01)
(52) U.S. Cl. ................................ 112/470.13; 112/100
(58) Field of Classification Search ............ 112/470.12, 112/470.13, 63, 99, 117, 104, 114, 308, 470.35, 112/402, 475.11, 475.18, 100, 101, 470.14; 156/93, 180, 433, 181; 442/327, 330; 428/98–102
See application file for complete search history.

(56) References Cited

U.S. PATENT DOCUMENTS 826,764 A * 7/1906 Cornely ........................ 112/99
1,286,703 A * 12/1918 Maynard ...................... 112/99
(Continued)

FOREIGN PATENT DOCUMENTS
DE 691 06 404 T2 5/1995
(Continued)

OTHER PUBLICATIONS
"Erlauterungen zur TFP-Technologie", www.hightex-dresden.de/tfptech Internet Citation. Mar. 7, 2005. PDF dated Sep. 27, 2006.

*Primary Examiner* — Ismael Izaguirre
(74) *Attorney, Agent, or Firm* — Gree, Burns & Crain, Ltd.

(57) ABSTRACT

Device for producing a fiber preform with virtually any desired surface geometry by a TFP process. A guiding device lays a fiber strand along virtually any desired path curve on a backing layer and a sewing head attaches the fiber strand on the backing layer by at least one fixing thread. The backing layer can be positioned in an xy direction in relation to the guiding device and the sewing head, wherein the sewing head and/or the guiding device can be positioned in a z direction. The separation of the positioning capabilities of the backing layer (xy direction) and the guiding device, the sewing head and the lower thread guide (z direction) provides a relatively simple device construction. Example devices can produce fiber preforms for dome-shaped composite components for use inter alia as pressure bulkheads for cabins in aircraft with virtually optimum properties.

13 Claims, 1 Drawing Sheet

U.S. PATENT DOCUMENTS

| | | | |
|---|---|---|---|
| 2,687,703 A * | 8/1954 | Shotsky | 112/100 |
| 4,495,231 A * | 1/1985 | Laskaris et al. | 428/36.1 |
| 4,512,835 A * | 4/1985 | Gardiner | 156/174 |
| 4,515,097 A * | 5/1985 | Rovin | 112/475.06 |
| 4,530,294 A * | 7/1985 | Pollmeier et al. | 112/63 |
| 4,594,122 A * | 6/1986 | McConnell | 156/433 |
| 4,889,063 A * | 12/1989 | Bompard et al. | 112/402 |
| 5,019,435 A * | 5/1991 | Cahuzac et al. | 428/36.1 |
| 5,429,853 A * | 7/1995 | Darrieux | 428/102 |
| 5,490,602 A * | 2/1996 | Wilson et al. | 216/56 |
| 5,915,317 A | 6/1999 | Thrash et al. | |
| 5,988,085 A * | 11/1999 | Martz | 112/470.13 |
| 6,096,164 A | 8/2000 | Benson et al. | |
| 2003/0145932 A1* | 8/2003 | Holmes et al. | 156/64 |
| 2004/0134593 A1 | 7/2004 | Ishibashi et al. | |
| 2005/0186868 A1* | 8/2005 | Horsting et al. | 442/59 |

FOREIGN PATENT DOCUMENTS

| | | |
|---|---|---|
| DE | 199 03 516 A1 | 8/2000 |
| DE | 101 23 064 A1 | 11/2002 |
| GB | 2 268 699 | 1/1994 |

* cited by examiner

DEVICE FOR PRODUCING A FIBER PREFORM WITH VIRTUALLY ANY DESIRED SURFACE GEOMETRY BY THE TFP PROCESS

FIELD OF THE INVENTION

The invention relates to a device for producing a fiber preform with virtually any desired surface geometry by the TFP process, wherein a fiber strand can be laid by a guiding device in virtually any desired path curve on a backing layer and the fiber strand can be attached on the backing layer by at least one fixing thread by means of a sewing head.

BACKGROUND OF THE INVENTION

In lightweight construction, in particular in aircraft construction and in aerospace, fiber-reinforced composite components, which have a high weight-saving potential on account of their high strength with at the same time low mass, are increasingly being used for load-bearing structural components.

The alignment of the reinforcing fibers in the finished composite component has a decisive influence on the achievable rigidity and strength. The reinforcing fibers should, as far as possible, follow the direction of loading, not have any wave formations and be subjected to uniform loading.

One possible way of complying with a requirement for a layer of fibers in accordance with loading is the so-called TFP process ("Tailored Fiber Placement"). This involves the laying of at least one fiber strand along any desired path curve and fixing of it on a backing layer with the aid of at least one attaching thread, whereby the position and orientation of the individual reinforcing fibers in a fiber preform that is formed in this way can be adapted in a virtually ideal way to the flux of force prevailing in the later composite component.

The production of the fiber preforms in the TFP process is performed on known devices, in particular on modern, computer-controlled automatic sewing and embroidering machines. Devices of this type for carrying out the TFP process generally have a stationary sewing head. Only the backing layer in which the fiber preform is formed by laying and attaching the fiber strands can be positioned in the spatial xy direction.

The fiber preform formed in this way may be impregnated with a curable polymer material or a resin system that can be cured by crosslinking, for example by means of the RTM process ("Resin Transfer Moulding"), to form a finished composite component.

A disadvantage of the known devices for carrying out the TFP process is that the fiber strand is only guided and laid in one plane, for example the xy plane. As a result, the fiber preform produced generally has a planar surface geometry. Only by further, downstream processing steps, for example re-forming, draping or the like, can the fiber preform be given a surface geometry that differs from the planar shape. However, the further processing of the initially planar fiber preform may cause undesired wave formations and displacements of the reinforcing fibers, so that the intended alignments of the reinforcing fibers in the fiber preform, in particular alignments oriented with the flux of force, are not achieved, or only partially.

SUMMARY OF THE INVENTION

It is one of the objects of the invention to provide a device for producing fiber preforms that allows fiber preforms to be produced with virtually any desired surface geometry, differing from the planar shape. The device according to the invention is additionally intended to necessitate only minor modifications to known devices for carrying out the TFP process.

Accordingly, a device for producing a fiber preform with virtually any desired surface geometry by the TFP process is provided, the device having the following features:

a) a fiber strand can be laid by a guiding device in virtually any desired path curve on an elastic and flexible backing layer, b) the fiber strand can be attached on the backing layer by at least one fixing thread by means of a sewing head, c) the backing layer can be positioned in an xy direction in relation to the guiding device and the sewing head, d) the sewing head and the guiding device can be positioned in a z direction, e) for the production of a fiber preform with virtually any desired surface geometry, the surface geometry of the backing layer can be varied by a multiplicity of rams arranged in a matrix-like manner underneath the backing layer and having resting means.

The fact that the backing layer can be positioned in a spatial xy direction in relation to the guiding device and the sewing head, wherein the sewing head and/or the guiding device can be positioned in a spatial z direction, makes it possible by means of the device according to the invention and the TFP process to produce a fiber preform which has virtually any desired surface geometry, in particular also a surface geometry differing from the planar shape, and in which moreover the reinforcing fibers are aligned substantially such that they are oriented with the flux of force. The device according to the invention in this case merely requires additional mobility of the sewing head in the spatial z direction, so that the already known devices for carrying out the TFP process can be converted or modified relatively easily.

By means of the device according to the invention, it is possible, for example, to produce a fiber preform which has a substantially domed-shaped surface geometry and a simultaneously virtually identical alignment of the reinforcing fibers, in particular an alignment oriented with the flux of force, and, after impregnation with a curable polymer material and the subsequent curing of the polymer material, can be used for example as a pressure bulkhead for fuselage cells of aircraft.

In accordance with a further embodiment, it is provided that, for the production of a fiber preform with virtually any desired surface geometry, a surface geometry of the backing layer can be varied by a ram. This allows a large number of variants of fiber preforms with different surface geometries to be laid on a universal base. The changing of the surface geometry of the backing layer is performed by a multiplicity of rams that are arranged underneath the backing layer and are formed such that they can be moved by actuators. Here, the backing layer moves in relation to the stationary rams, by moving over them.

A further embodiment provides that the backing layer is accommodated in a clamping frame. This allows the movement of the backing layer in the xy direction to be achieved in a simple way by corresponding movement of the clamping frame by means of actuators, controlled by an open-loop and closed-loop control device. If appropriate, in particular if there is inadequate elasticity of the backing layer, it may be required to vary the geometry of the clamping frame by means of actuators, in order to assist the variation of the surface geometry of the backing layer by the rams.

A further embodiment of the device according to the invention provides that the backing layer is formed by a sheet-like knitted fabric, in particular a woven fabric or the like, for the attachment of a fiber strand by the conventional method of attachment with an upper fixing thread and a lower fixing thread. This allows the conventional devices for carrying out the TFP process with an upper fixing thread and a lower fixing thread to continue to be used after a corresponding structural modification, in particular in the form of the additional positionability of the sewing head and the guidance of the lower thread in the z direction.

In accordance with a further embodiment, the backing layer is formed by an elastic and flexible sheet-like formation, in particular by a rubber sheet, for attaching the fiber strands by the "tufting" process.

The use of a rubber sheet or a rubber mat allows attachment of the fiber strands in the so-called "tufting" process by means of the upper fixing thread alone, so that it is possible to dispense entirely with both the lower thread guide and the lower fixing thread. This provides a construction of the device according to the invention that is considerably simpler. The upper fixing thread is hereby introduced at least superficially into the rubber sheet and becomes bound in it on account of the high elasticity, so that, when the needle is pulled out, it forms a loop which is lodged in the region of the surface of the rubber sheet and ensures adequately secure attachment of the fiber strand, even without a backing layer in the sense of the conventional method of attachment with upper and lower fixing threads.

DETAILED DESCRIPTION OF THE INVENTION

Figure 1:
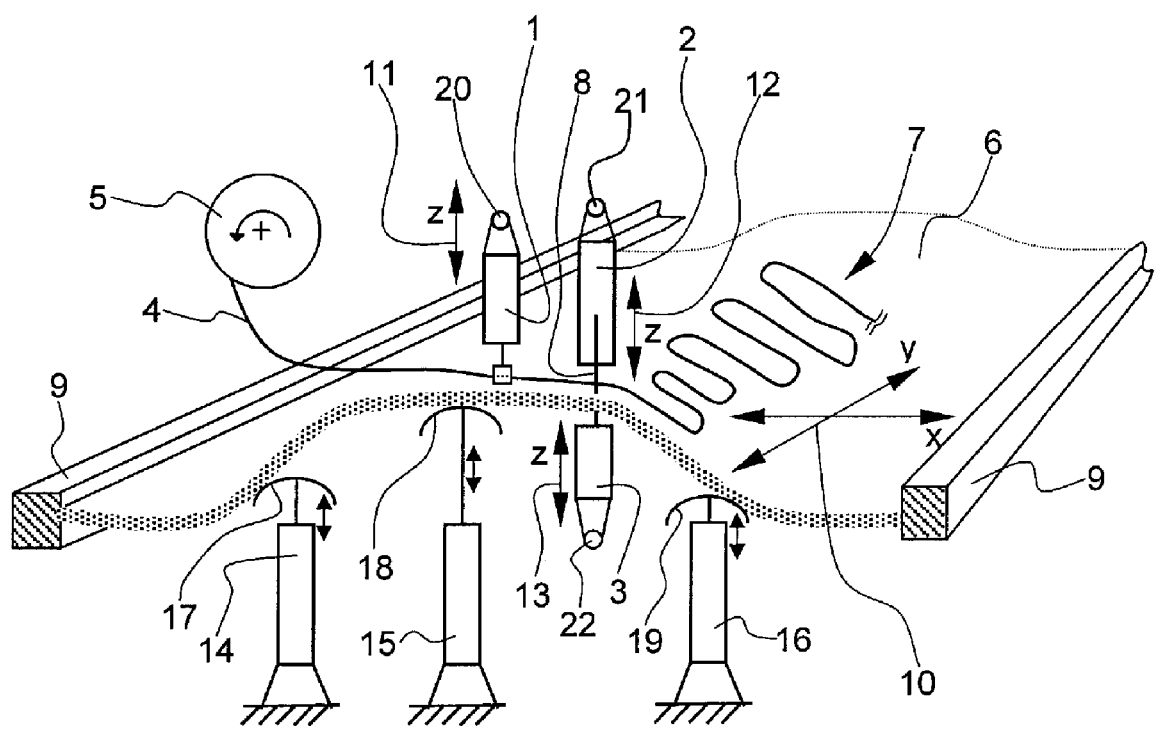
FIG. 1 shows a perspective basic representation of the device according to the invention.

FIG. 1 shows a perspective basic representation of the device according to the invention.

The device comprises a guiding device 1, a sewing head and a lower thread guide 3. A fiber strand 4 is drawn off continuously from a supply roll 5 and laid by the guiding device 1 on a backing layer 6 in virtually any desired path curve to form a fiber preform 7. Subsequently, the fiber strand is attached on the backing layer 6 by a needle 8 arranged at the sewing head 2. This involves using an upper fixing thread and a lower fixing thread that are not represented. The upper fixing thread and the lower fixing thread form underneath the backing layer 6 a multiplicity of loops, by means of which the fiber strand 4 is attached on the backing layer 6. The upper fixing thread is led through the needle 8 in the region of the sewing head 2, while the lower fixing thread is passed through the lower thread guide 3 underneath the backing layer 6. In order that the needle 8 can penetrate the backing layer 6 together with the upper fixing thread for the connection and interlinkage with the lower fixing thread, it is formed for example as a cloth-like woven fabric with a relatively low material strength.

The backing layer 6 is accommodated in the clamping frame 9. The clamping frame 9 can be positioned exclusively in the spatial xy direction, as indicated by the system of coordinates 10, in relation to the guiding device 1, the sewing head 2 and the lower thread guide 3 by means of actuators that are not represented. In the exemplary embodiment shown of FIG. 1, the guiding device 1 and the sewing head 2 can be positioned only in the spatial z direction, as indicated by the arrows 11, 12, by actuators that are likewise not represented. The lower thread guide 3 can likewise be positioned in the spatial z direction, in the direction of arrow 13.

The movement of the sewing head 2 and of the lower thread guide 3 is performed with preference in parallel. As a result of the separation of the mobilities, a simpler construction of the device is obtained. In particular, already known devices can be modified by adding a positioning capability of the sewing head 2, of the guiding device 1 and of the lower thread guide 3 in the z direction in accordance with the device according to the invention, since these devices are generally already provided by the manufacturer with the capability of positioning the clamping frame 9 in the xy direction. All that is required in addition to this is to provide a number of rams for modifying the surface geometry of the backing layer 6.

To be able to lay a fiber preform 7 with a surface geometry that differs from a planar shape, the surface geometry of the backing layer 6 can be varied by three rams 14, 15, 16. For this purpose, the rams 14, 15, 16 are formed such that they can be positioned parallel to the z direction, in the direction of the small black double-headed arrows, by actuators that are not represented any more specifically. The rams 14, 15, 16 are, as indicated, firmly connected to the base. Furthermore, the rams 14, 15, 16 have resting means 17, 18, 19, which make it easier for the backing layer 6 to slide over the stationary rams 14, 15, 16. The resting means 17, 18, 19 may be formed, for example, as mushroom-shaped supporting plates. The supporting plates may be additionally coated with a material with sliding properties or consist of such a material, in order to make the movement of the backing layer 6 in the xy direction easier. To further improve the sliding over of the backing layer 6, the resting means 17, 18, 19 may also be formed as a roller rest or the like. The positioning of the rams 14, 15, 16 in the direction of the small black double-headed arrows allows the backing layer 6 to be given virtually any desired surface geometry, differing from the planar shape. In addition to the possibility of movement in the z direction, the rams 14, 15, 16 may, if required, be formed such that they can be pivoted by means of actuators about axes arranged in the lower region of the rest, in order to increase the number of positioning possibilities, and consequently the range of variation in changing the surface geometry of the backing layer 6.

Located underneath the backing layer 6, concealed by it, are further rams, which are not represented but are formed in a way corresponding to the rams 14, 15, 16. The rams 14, 15, 16 are arranged with preference in a matrix-like arrangement, preferably spaced apart uniformly from one another, underneath the region of the backing layer 6 on which the fiber preform 7 is to be laid.

The deformation of the backing layer 6 to create any desired surface geometry is conditional on a certain elasticity of the backing layer 6. Should the elasticity of the material that is used for the backing layer 6 not be adequate to achieve a prescribed surface geometry, it may be necessary additionally to modify slightly the geometry of the clamping frame 9 by means of actuators that are not represented any more specifically.

In addition, in the exemplary embodiment of the device shown, the guiding device 1, the sewing head 2 and the lower thread guide 3 are formed such that they can be pivoted about axes 20, 21, 22, so that the degrees of freedom available for the positioning are increased. Furthermore, it is possible to form the guiding device 1, the sewing head 2 and the lower thread guide 3 such that they can be respectively pivoted about a further axis, arranged substantially perpendicular to the axes 20, 21, 22, so that the number of degrees of freedom increases further. If appropriate, the supply roll 5 is formed such that it can be moved parallel to the guiding device 1, the sewing head 2 and the lower thread guide 3 by means of actuators that are not represented. The pivoting of the guiding device 1, the sewing head 2 and the lower thread guide 3 about the axes 20, 21, 22 is performed by corresponding actuators that are not represented any more specifically. The positions of all the actuators are controlled by means of an open-loop and closed-loop control device that is not represented any more specifically.

As a result of the comprehensive positioning capabilities of the guiding device 1, the sewing head 2 and the lower thread guide 3 in conjunction with the rams 14, 15, 16 as well as the clamping frame 9, it is possible by means of the device according to the invention to form fiber preforms 7 with virtually any desired surface geometry. For example, as illustrated in the exemplary embodiment of FIG. 1, the fiber preform 7 can be laid or built up with a substantially wavy surface geometry.

The open-loop and closed-loop control device activates the respective actuators for the guiding device 1 and the sewing head 2 here in such a way that the guiding device 1 with the fiber strand 4, the sewing head 2 and the lower thread guide 3 are at an optimum distance from the backing layer 6—respectively adapted to the local surface curvature or surface geometry of the fiber preform 7—and at the same time laying of the strand is performed along a prescribed path curve, in particular such that it is oriented with the flux of force. By means of the device according to the invention, it is possible moreover to lay a number of layers of fiber strands 4 one on top of the other to form fiber preforms with greater material thickness. The achievable number of layers arranged one on top of the other is substantially dependent here on the length of the needle 8.

The fiber strand 4 is formed by a multiplicity of reinforcing fibers arranged substantially parallel to one another. Carbon fibers, glass fibers, aramid fibers or the like are used, for example, as reinforcing fibers. To produce a finished composite component from the fiber preform 7, it is removed from the device according to the invention and impregnated with a curable polymer material, for example in accordance with the known RTM process in a closable and preferably heatable mould, and subsequently cured. An epoxy resin, a polyester resin, a BMI resin or the like is preferably used as the curable polymer material or resin system that can be cured by crosslinking.

By suitable activation of the actuators of the guiding device 1, the actuators of the sewing head 2, the actuators of the lower thread guide 3, the actuators of the rams 14, 15, 16 for varying the surface geometry of the backing layer 6 and the actuators for positioning the clamping frame 9 in the xy direction by means of the open-loop and closed-loop control device, it is also additionally possible to produce fiber preforms that are curved in two spatial dimensions, that is to say for example spherically curved fiber preforms with a dome-shaped surface geometry or the like. After impregnation with a curable polymer material and a subsequent curing process, such fiber preforms can be used inter alia for producing pressure bulkheads that are formed in one piece, for pressurized cabins of fuselage cells of aircraft or the like.

It may be possible for the actuators to be actuated mechanically, electrically, pneumatically, hydraulically or in some other way or in a combination of the physical operating mechanisms mentioned. In a particularly advantageous way, the actuators are realized by electrically operated spindle drives or the like, which allow easy activation by means of the open-loop and closed-loop control device with at the same time very high positioning accuracy and in addition, by contrast with pneumatic cylinders or the like, can also assume intermediate positions. Furthermore, along with a relatively simple construction, electrically operated spindle drives have a high setting speed with sufficiently high reproducing accuracy.

In a variant of the device according to the invention that is not represented, the backing layer 6 may be formed by an elastic and flexible material, in particular by an elastomer or the like. For example, the backing layer 6 may be formed as a rubber mat or as a rubber sheet with a relatively small material thickness. With preference, the rubber sheet is accommodated by the clamping frame 9. Given sufficient intrinsic stability of the rubber sheet, it may be possible to dispense with the clamping frame 9.

This variant has the great advantage that it is possible to dispense with the lower fixing thread, and consequently also with the lower thread guide 3, when attaching the fiber strand 4. The laid fiber strand 4 is preferably fixed on the rubber sheet in the "tufting" process by means of the upper fixing thread alone. When doing so, the needle 8 does not completely perforate the rubber sheet, but penetrates only superficially into it. As a result of the defined elasticity of the rubber sheet, however, the upper fixing thread becomes bound within the rubber sheet when the needle 8 is withdrawn, whereby a loop of the upper fixing thread that is mechanically sufficiently fixed forms in the region of the piercing location. As a result of these loops of the upper fixing thread that are formed in the region of the upper side of the rubber sheet, adequate attachment of the fiber strands on the rubber sheet is achieved. Since the attachment is brought about just by the loop formation of the upper fixing thread in the rubber sheet, the finished fiber preform 7 can be lifted off from the rubber sheet relatively easily and without any damage occurring. Therefore, no fabric-like, textile backing layer 6 remains under the fiber preform 7 after the latter has been completed. Instead of a rubber sheet, it is also possible, for example, to use an elastic foam plastic sheet or the like.

When carrying out the "tufting" process on the device according to the invention, it is accordingly possible to dispense completely with a backing layer that is formed in a fabric-like, textile manner to allow penetration with the needle, provided for the purpose of laying and attaching the fiber strand 4 and possibly representing a region of preferential delamination, in particular in multi-layered fiber preforms 7. In addition, when attaching the fiber strands by means of the "tufting" process, the lower fixing thread and the lower thread guide 3 are dispensable, so that the structural complexity of the device according to the invention is reduced considerably.

The invention accordingly relates to a device for producing a fiber preform 7 with virtually any desired surface geometry by the TFP process, wherein a fiber strand 4 can be laid by guiding device 1 in virtually any desired path curve on a backing layer 6 and the fiber strand 4 can be attached on the backing layer 6 by at least one fixing thread by means of a sewing head 2, wherein the backing layer 6 can be positioned in an xy direction in relation to the guiding device 1 and the sewing head 2, wherein the sewing head 2 and/or the guiding device 1 can be positioned in a z direction.

For the production of a fiber preform 7 preferably with virtually any desired surface geometry, the surface geometry of the backing layer 6 can be varied by rams 14, 15, 16.

The backing layer 6 is in particular accommodated in a clamping frame 9.

The backing layer 6 is advantageously formed by a sheet-like knitted fabric, in particular a woven fabric or the like, for the attachment of a fiber strand 4 by the conventional method of attachment with an upper fixing thread and a lower fixing thread.

In the region of the sewing head 2 underneath the backing layer 6, there is arranged, for example, a lower thread guide 3 for guiding the lower fixing thread.

The sewing head 2 and/or the lower thread guide 3 can preferably be respectively pivoted about at least one axis 21, 22.

The positioning of the sewing head 2, the lower thread guide 3 and the guiding device 1 is performed in particular by actuators.

The clamping frame 9 and the rams 14, 15, 16 can advantageously be positioned by actuators.

The actuators can preferably be controlled by an open-loop and closed-loop control device.

The backing layer 6 is formed, for example, by an elastic and flexible sheet-like formation, in particular by a rubber sheet, for attaching the fiber strands by the tufting process.

The sewing head 2 and/or the guiding device 1 can preferably be positioned by actuators.

The clamping frame 9 and the rams 14, 15, 16 can advantageously be positioned by actuators.

The actuators can preferably be controlled by means of an open-loop and closed-loop control device.

What is claimed is:

1. A device for producing a fiber preform with virtually any desired surface geometry by a TFP process, comprising:
    a guiding device for laying a fiber strand along virtually any desired path curve on an elastic and flexible backing layer,
    a sewing head for attaching the fiber strand on the backing layer by at least one fixing thread,
    means for positioning the backing layer in an xy direction in relation to the guiding device and the sewing head,
    means for positioning the sewing head and the guiding device in a z direction,
    a multiplicity of rams arranged in a matrix-like manner underneath the backing layer for varying its surface geometry for the production of a fiber preform with virtually any desired surface geometry.

2. The device according to claim 1, including a clamping frame for accommodating the backing layer.

3. The device according to claim 1, wherein the backing layer is formed by a woven fabric, for the attachment of the fiber strand by attachment with an upper fixing thread and a lower fixing thread.

4. The device according to claim 1, wherein, in the region of the sewing head underneath the backing layer, there is arranged a lower thread guide for guiding the lower fixing thread.

5. The device according to claim 4, wherein at least one of the sewing head and the lower thread guide is respectively pivotable about at least one axis.

6. The device according to claim 4, including actuators for positioning of the sewing head, the lower thread guide and the guiding device.

7. The device according to claim 4, including actuators for positioning the clamping frame and the rams.

8. The device according to claim 4, including an open-loop and closed-loop control device for controlling the actuators.

9. The device according to claim 1, wherein the backing layer is formed by an elastic and flexible sheet-like formation for attaching the fiber strands by a tufting process.

10. The device according to claim 1, wherein the backing layer is a rubber sheet.

11. The device according to claim 10, including actuators for positioning at least one of the sewing head and the guiding device.

12. The device according to claim 2, including actuators for positioning the clamping frame and the rams.

13. The device according to claim 12, including an open-loop and closed-loop control device for controlling the actuators.

* * * * *

UNITED STATES PATENT AND TRADEMARK OFFICE
CERTIFICATE OF CORRECTION

PATENT NO. : 7,954,440 B2  Page 1 of 1
APPLICATION NO. : 11/988974
DATED : June 7, 2011
INVENTOR(S) : Paul Joern et al.

It is certified that error appears in the above-identified patent and that said Letters Patent is hereby corrected as shown below:

In the Specification:

Col. 3, line 38      After "sewing head" insert --2--.

Col. 6, line 27      After "fiber strands" insert --4--.

Signed and Sealed this
Thirteenth Day of December, 2011

David J. Kappos
*Director of the United States Patent and Trademark Office*